(12) United States Patent
Forthman et al.

(10) Patent No.: US 6,408,312 B1
(45) Date of Patent: Jun. 18, 2002

(54) METHOD AND SYSTEM FOR SUPPORTING MULTIPLE, HISTORICAL, AND FUTURE DESIGNS IN A RELATIONAL DATABASE

(75) Inventors: Daniel Forthman; Richard Matthews, both of Tulsa, OK (US)

(73) Assignee: Visionael Corporation, Palo Alto, CA (US)

( * ) Notice: Subject to any disclaimer, the term of this patent is extended or adjusted under 35 U.S.C. 154(b) by 0 days.

(21) Appl. No.: 09/385,783

(22) Filed: Aug. 30, 1999

(51) Int. Cl.[7] .............................................. G06F 12/00
(52) U.S. Cl. ................ 707/203; 707/1; 707/9
(58) Field of Search ........................ 707/1–10, 102, 707/103, 103 R, 9, 203; 709/226; 717/2

(56) References Cited

U.S. PATENT DOCUMENTS

| | | | |
|---|---|---|---|
| 5,276,901 A | * 1/1994 | Howell et al. | 707/9 |
| 5,317,729 A | * 5/1994 | Mukherjee et al. | 707/3 |
| 5,706,506 A | * 1/1998 | Jensen et al. | 707/103 |
| 5,787,437 A | * 7/1998 | Potterveld et al. | 707/103 |
| 5,950,201 A | * 9/1999 | Van Huben et al. | 707/102 |
| 6,023,578 A | * 2/2000 | Birsan et al. | 717/2 |
| 6,167,405 A | * 12/2000 | Rosensteel, Jr. et al. | 707/102 |
| 6,169,993 B1 | * 1/2001 | Shutt et al. | 707/103 R |

* cited by examiner

*Primary Examiner*—Hosain T. Alam
*Assistant Examiner*—Anh Ly
(74) *Attorney, Agent, or Firm*—Sawyer Law Group LLP

(57) ABSTRACT

A method and system in accordance with the present invention receives correct information concerning a design in a database. The method comprises selecting a most recent instance of an object in the design and analyzing the dependencies of that object on the other objects in the design database. Through the use of a method and system in accordance with the present invention, relational database management systems will have the capability of building designs upon other designs by presenting the user with the appropriate versions of objects from earlier designs. The method and system in accordance with the present invention will also allow changes to the ordering of designs within restrictions based on the dependencies between the designs. This will give the user the ability to stay up-to-date on current network information, review previous network configurations and work on as many proposed network configurations as desired.

24 Claims, 5 Drawing Sheets

METHOD AND SYSTEM FOR SUPPORTING MULTIPLE, HISTORICAL, AND FUTURE DESIGNS IN A RELATIONAL DATABASE

FIELD OF THE INVENTION

The present invention relates generally to relational database management systems and specifically to a method and system to support multiple designs in a relational database.

BACKGROUND OF THE INVENTION

A conventional relational database management system (RDBMS) allows for the definition of data structures, storage and retrieval operations and integrity constraints. In such a database the data and relations between them are organized in tables. A table is a collection of records and each record in a table contains the same fields. Certain fields may be designated as keys which indicates the fields which uniquely identify the records in that table. Indexes will be maintained on key fields and on other selected fields. These indexes speed up searches for specific values of those fields.

Leading physical management products use relational database management systems to store network object data in tables corresponding to each object type. An object is a general designation that can refer to a map, location, floor, room, cabinet, device, port, or cable. Information about the objects which make up a network configuration at a point in time (either in the past, present, or future) is collected into a design. A design is a set of objects which are intended to be placed into service as a complete group.

Designs can be historic or proposed. The effective date of a historic design is the date that its objects were actually in the physical network and available for use. Proposed (or future) designs have an effective date indicating when they are expected to be placed in service. Designs are ordered by the date they became effective or are proposed to become effective. Proposed designs are classified as private or public. Objects in public designs are viewable by other designs with later effective dates. Objects in private designs are hidden from all other designs. Historic designs are always public.

Each object in a design is associated with the design to which it was first added, and changes to an object are stored as a modified copy of the object which is associated with the design in which the change occurs. Because the object types have a hierarchical relationship with each other, certain restrictions are imposed regarding which design the objects can be in. For example, if a device is located in a cabinet, the device can not exist in a design that occurs earlier than the design of the cabinet. Also, if the cabinet's design is private as opposed to public, any devices placed in that cabinet must be in the same design because private designs are not visible in other designs.

Conventional Network Management Systems (NMSs) provide system users with information regarding whether specific objects are running properly or are not running properly, as well as information about how objects are connected to each other. FIG. 1 shows how a system user 100 accesses the network model, stored in a relational database 104 via a typical NMS 102. However, these systems don't comprehensively track design objects or associate them with designs that are dependent upon them.

Because of the dependencies that can exist between objects that may be in different designs, certain operations like changing the effective date of a design and changing a design from public to private may not be allowed. When the effective date of a design is changed, it may cause an order conflict between an object in that design and an object in another design. When a public design becomes private, its objects are no longer visible to other designs, and some objects may become orphaned. If an operation would cause such conflicts, then the operation should not be allowed to take place.

To get the correct information about an object in a specific design, a user must be able to select the most recent instance of that object from the specified design or from all public designs that have an effective date earlier than the specified design. This selection operation will be performed often for many objects of all types, therefore its performance must be quick enough to present the results to the user without noticeable delay.

Therefore, what is needed is a method and system that allows the user to handle multiple designs while having the capability of building designs based upon historic and proposed designs. The system should analyze the dependencies of objects in a design and identify which objects are dependent upon objects in earlier public designs. The system should allow the user to stay up-to-date on current network information, review previous network configurations and work on as many proposed network configurations as desired. The present invention addresses such a need.

SUMMARY OF THE INVENTION

A method and system in accordance with the present invention receives correct information concerning a design in a database. The method comprises selecting a most recent instance of an object in the design and analyzing the dependencies of that object on the other objects in the design database.

Through the use of a method and system in accordance with the present invention, relational database management systems will have the capability of building designs upon other designs by presenting the user with the appropriate versions of objects from earlier designs. The method and system in accordance with the present invention will also allow changes to the ordering of designs within restrictions based on the dependencies between the designs. This will give the user the ability, to stay up-to-date on current network information, review previous network configurations and work on as many proposed network configurations as desired.

DETAILED DESCRIPTION

The present invention provides a method and system for receiving correct information concerning objects within a design in a database. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiments shown but is to be accorded the widest scope consistent with the principles and features described herein.

The method and system in accordance with the present invention is disclosed in the context of a preferred embodiment. The preferred embodiment allows for the use of dynamically created graphic representations of physical network design configurations based on the actual network configuration information stored in a relational database. These are called "virtual drawings". The preferred embodiment further provides a system user with the ability to stay up-to-date on current network design information, review previous network design configurations and work on as many proposed network design configurations as desired.

Each network object within each individual network design configuration has a unique identifier that triggers a collection of information in the relational database. Anytime a change is made to the graphical representation of a network object, the change is immediately reflected in the relational database. Conversely, anytime a change is made in the relational database the change is immediately reflected in the graphical representation of the network object.

Figure 1:
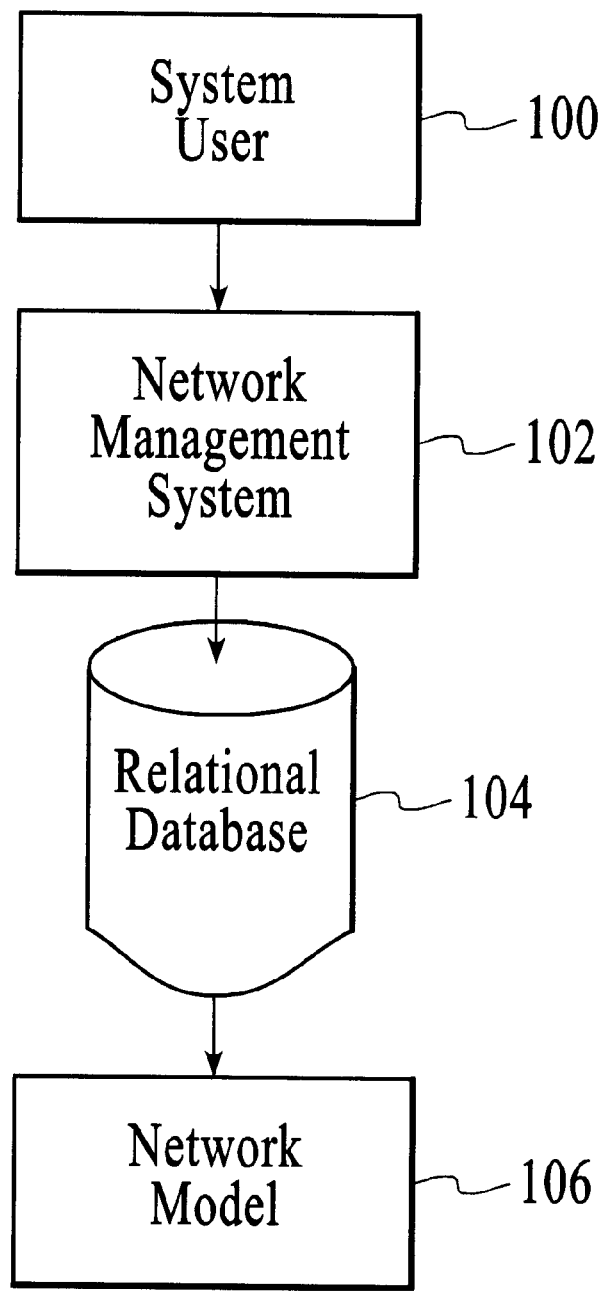
FIG. 1 shows a conventional Network Management System environment.
Figure 2:
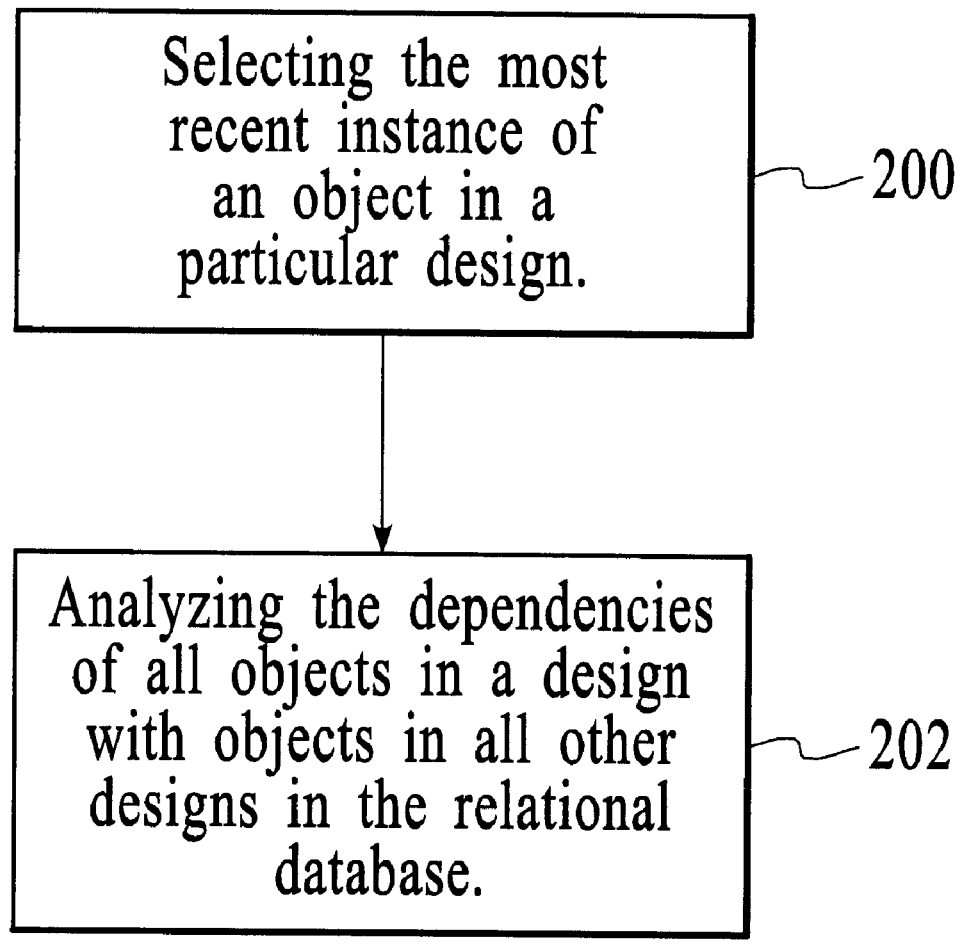
FIG. 2 is a simple block diagram of a system in accordance with the present invention.

To describe the operation of a system in accordance with the present invention, refer now to FIG. 2. FIG. 2 is a simple diagram of a method in accordance with the present invention. The most recent instance of an object in a design is selected, via step 200. The dependencies between all objects in a design on objects in all other designs in the relational database are analyzed, via step 202.

OPERATION

Figure 3:
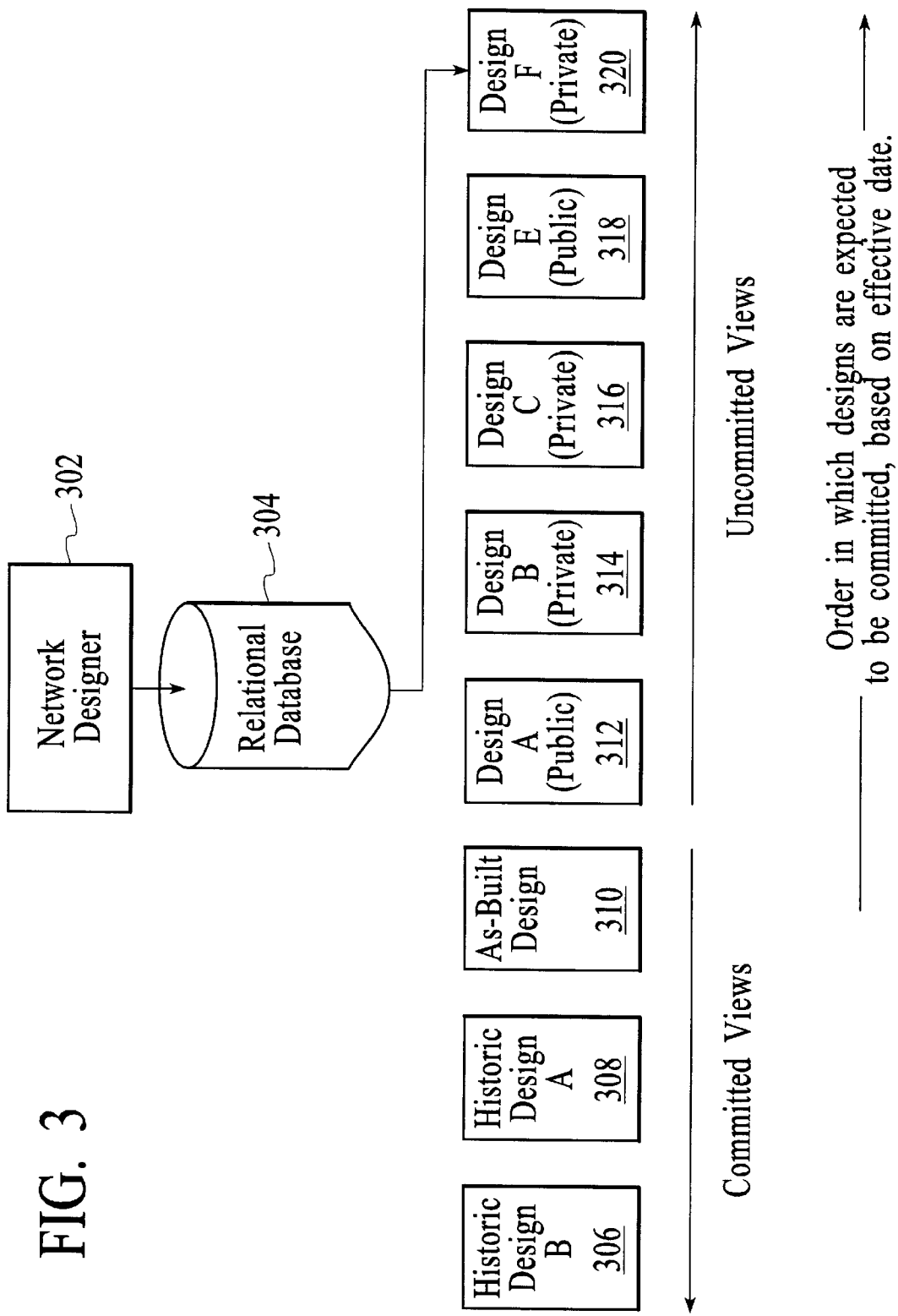
FIG. 3 shows a block diagram of a system for supporting multiple network designs in accordance with the present invention.
Figure 4:
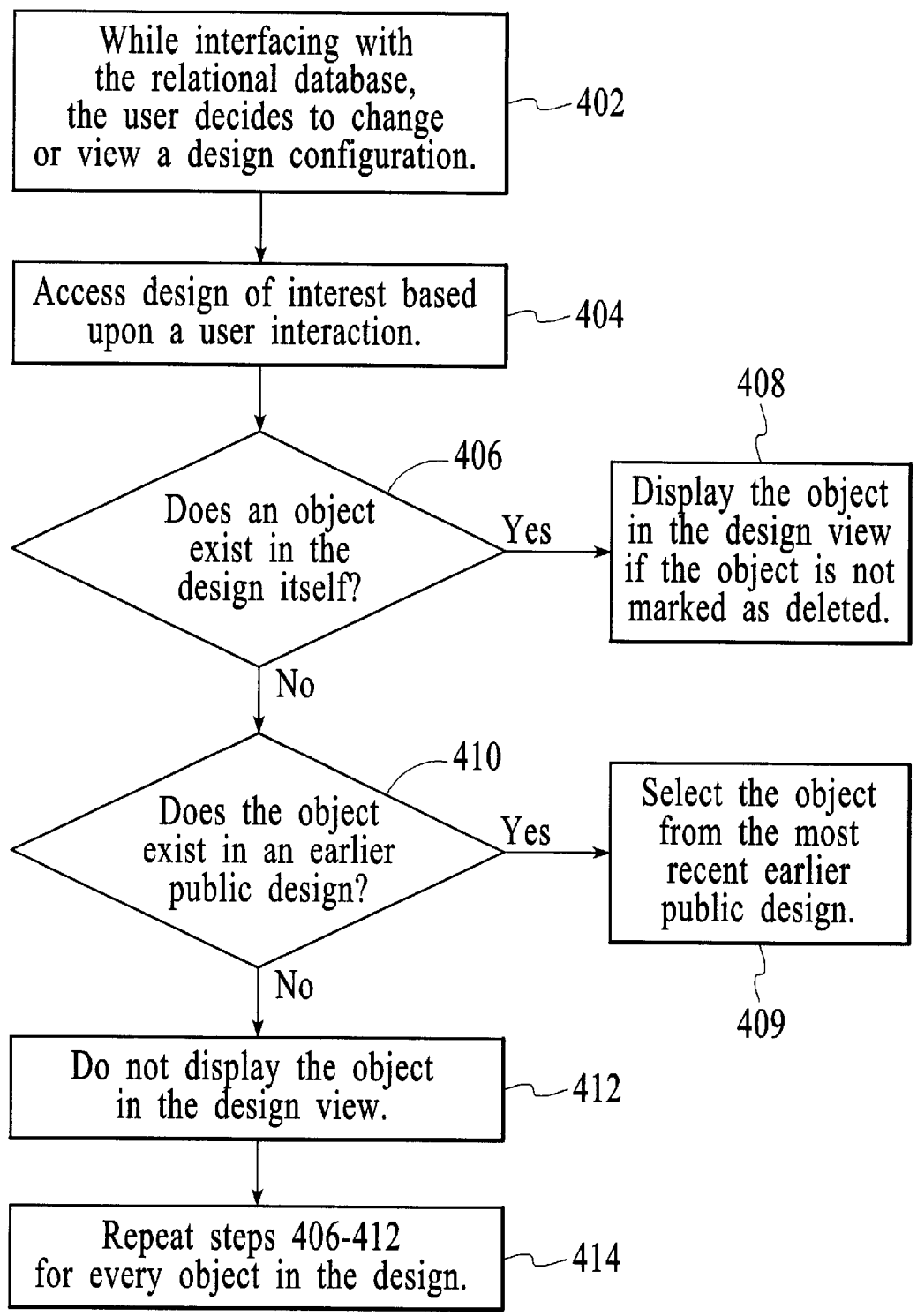
FIG. 4 is a flowchart of how the system in accordance with the present invention selects objects to be viewed in a particular design.
Figure 5:
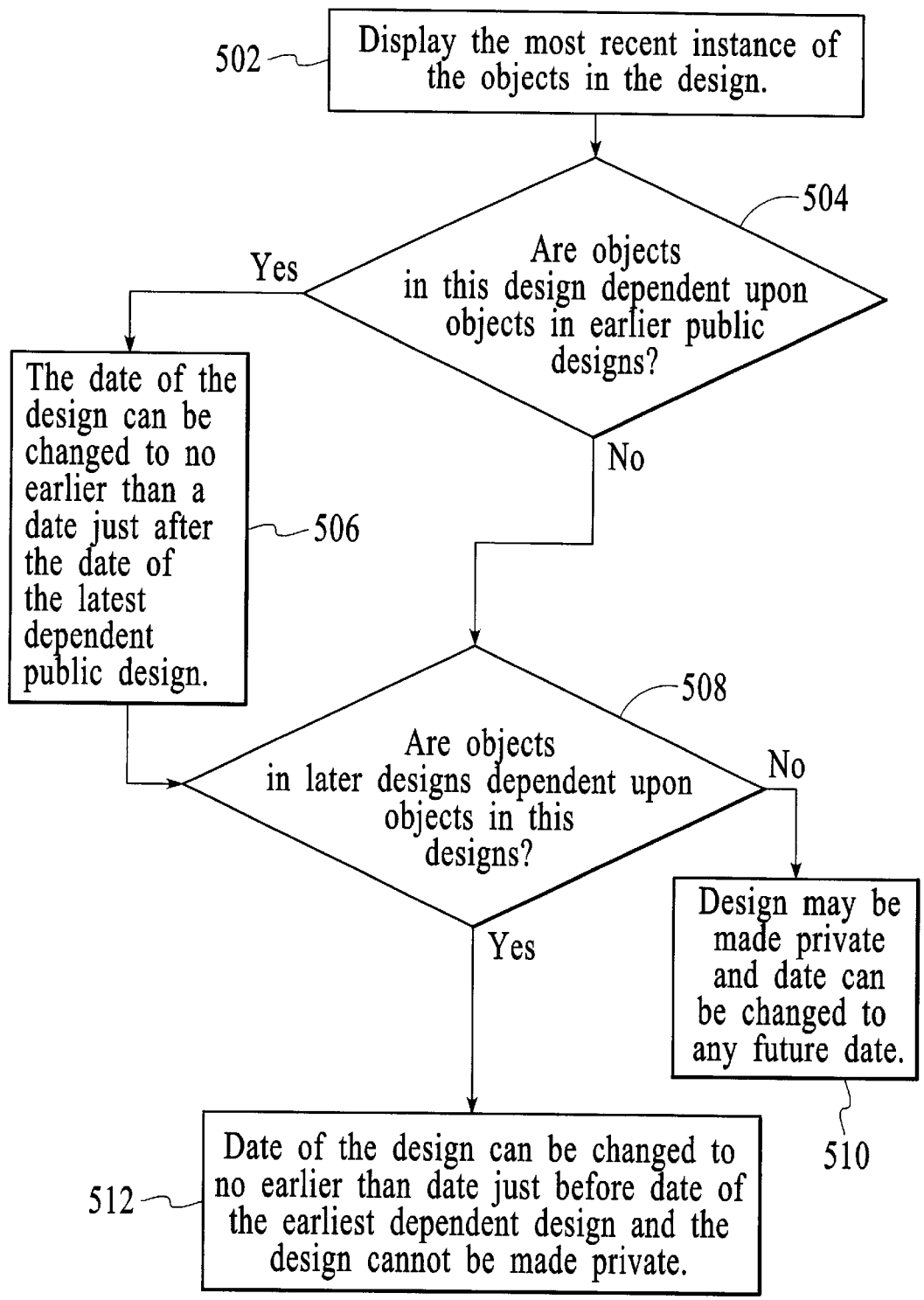
FIG. 5 is a flowchart of how the system in accordance with the present invention analyzes the dependencies of the objects in a particular design.

To more fully describe the operation of the present invention in the context of a preferred embodiment, FIG. 3 is a block diagram of the operation of the system in accordance with the present invention. FIG. 4 is a detailed flowchart of how the system in accordance with the present invention selects objects to be viewed in a particular design. FIG. 5 is a detailed flowchart of how the system in accordance with the present invention analyzes the dependencies of the objects in a particular design configuration with other objects within the design configuration.

Selecting Design Objects to be Viewed

Referring to FIG. 3 and FIG. 4 together first, while interfacing with the relational database 304 the network designer 302 decides to change or view a design configuration, via step 402. Next, the system accesses the design of interest based upon a user interaction, via step 404. Any particular design configuration contains the as-built design, which represents the current documented network, plus the historic and future designs. Accordingly, the network designer can access the historic designs, the as-built design or any future designs. For instance, Design F 320 contains the as-built view 310 plus any changes made to Design A 312 and Design E 318. Private designs 314, 316, 320 do not share their information, but they are affected by public designs with earlier effective dates.

When a design is committed, it becomes the new as-built design. Historic designs 306, 308 and the as-built design 310 are considered committed views, while future designs are uncommitted views. Future designs are committed in the order of their effective dates. In other words, the earlier the effective date of the future design, the earlier the future design can be committed.

Referring back to FIG. 4, it is determined whether an object exists in the design itself, via step 406. If an undeleted object exists in the design itself, the object is displayed in the design view, via step 408. If the object doesn't exist in the design itself, it is the determined whether the object exists in an earlier public design, via step 410. If the object does exist in an earlier public design, the latest version of the object is displayed in the design view, via step 408 if not flagged as deleted. If the object does not exist in an earlier public design, the system does not display the object in the design view, via step 412. Steps 406–412 are repeated for every object in the design, via step 414.

Analyzing the Dependencies of the Design Objects

Refer now to FIG. 5. Once the user decides to change the effective date of a design or change a public design to a private design, a design view is displayed which shows the most recent instance of the objects in the design, via step 502. Next, in order to determine the earliest allowable date, it is determined whether objects in the design are dependent upon objects in earlier public designs, via step 504. If any object(s) in the design is dependent upon any object(s) in earlier public designs, the date of the design can be changed to a date no earlier than just after the date of the latest dependent public design, via step 506. To determine the latest allowable date, it is then determined whether there are any object(s) in later designs that are dependent upon any object(s) in the current design, via step 508. If there are objects in later designs that are dependent upon objects in the current design, then the date of the design can be changed to no later than just before the date of the earliest dependent design and the design cannot be made private, via step 512. If there are no objects in later designs that are dependent upon objects in the current design, the date of the design can be changed to any future date and the current design may be made private, via step 510.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for receiving correct information concerning a plurality of designs in a database, wherein the plurality of designs comprises at least one public design and at least one private design and each design includes an effective date and a plurality of objects, the method comprising the steps of:

a) selecting a design in a design configuration, wherein the design configuration comprises at least one historical design, an as-built design, and at least one future design;

b) determining a most recent instance of each object of the selected design from the selected design or any public designs having an earlier effective date; and c) analyzing the dependencies of the most recent instance of each object of the selected design on the plurality of objects of each of the plurality of designs.

2. The method of claim 1 in which the analyzing step (c) further comprises:

(c1) identifying all objects in one or more public designs upon which any object of the selected design depends; and (c2) identifying all objects in one of more later designs that are dependent upon any object of the selected design.

3. The method of claim 2 wherein the one or more public designs have earlier effective dates.

4. The method of claim 3 wherein if there are no objects in the one or more later designs that are dependent upon any objects of the selected design, the selected design can be made private.

5. A system for receiving correct information concerning a plurality of designs in a database, wherein the plurality of designs comprises at least one public design and at least one private design and each design includes an effective date and a plurality of objects, the system comprising:

means for selecting a design in a design configuration, wherein the design configuration comprises at least one historical design, an as-built design, and at least one future design;

means for determining a most recent instance of each object of the selected design from the selected design or any public designs having an earlier effective date; and means for analyzing the dependencies of the most recent instance of each object of the selected design on the plurality of objects of each of the plurality of designs.

6. The system of claim 5 in which the analyzing means further comprises:

means for identifying all objects in one or more public designs upon which any object of the selected design depends; and means for identifying all objects in one or more later designs that are dependent upon any object of the selected design.

7. The system of claim 6 wherein the one or more public designs have earlier effective dates.

8. The system of claim 7 wherein if there are no objects in the one or more later designs that are dependent upon any objects of the selected design, the selected design can be made private.

9. A computer readable medium containing program instructions for receiving correct information concerning a plurality of designs in a database, wherein the plurality of designs comprises at least one public design and at least one private design and each design includes an effective date and a plurality of objects, the program instructions comprising the steps of:

a) selecting a design in a design configuration, wherein the design configuration comprises at least one historical design, an as-built design, and at least one future design;

b) determining a most recent instance of each object of the selected design from the selected design or any public designs having an earlier effective date; and c) analyzing the dependencies of the most recent instance of each object of the selected design on the plurality of objects of each of the plurality of designs.

10. The computer readable medium of claim 9 in which the analyzing instruction (c) further comprises:

(c1) identifying all objects in one or more public designs upon which any object of the selected design depends; and (c2) identifying all objects in one of more later designs that are dependent upon any object of the selected design.

11. The computer readable medium of claim 10 wherein the one or more public designs have earlier effective dates.

12. The computer readable medium of claim 11 wherein if there are no objects in the one or more later designs that are dependent upon any objects of the selected design, the selected design can be made private.

13. The method of claim 4, wherein the effective date of the selected design can be changed to any future date.

14. The method of claim 2, wherein if any objects in one or more later designs depends upon any object of the selected design, the effective date of the selected design can be changed to a date no later than the earliest effective date of the one or more later designs.

15. The method of claim 2, wherein if any objects in the selected design depend on any objects in the one or more earlier public designs, the effective date of the selected design can be changed to a date no earlier than the latest effective date of the one or more earlier public designs.

16. The method of claim 1, wherein the design comprises a network design and the plurality of objects include a map, location, floor, room, cabinet, device, port, and cable for the network design.

17. The system of claim 8, wherein the effective date of the selected design can be changed to any future date.

18. The system of 1, wherein if any objects in one or more later designs depends upon any object of the selected design, the effective date of the selected design can be changed to a date no later than the earliest effective date of the one or more later designs.

19. The system of claim 6, wherein if any objects in the selected design depend on any objects in the one or more earlier public designs, the effective date of the selected design can be changed to a date no earlier than the latest effective date of the one or more earlier public designs.

20. The system of claim 5, wherein the design comprises a network design and the plurality of objects include a map, location, floor, room, cabinet, device, port, and cable for the network design.

21. The computer readable medium of claim 12, wherein the effective date of the selected design can be changed to any future date.

22. The computer readable medium of claim 10, wherein if any objects in one or more later designs depends upon any object of the selected design, the effective date of the selected design can be changed to a date no later than the earliest effective date of the one or more later designs.

23. The computer readable medium of claim 10, wherein if any objects in the selected design depend on any objects in the one or more earlier public designs, the effective date of the selected design can be changed to a date no earlier than the latest effective date of the one or more earlier public designs.

24. The method of claim 9, wherein the design comprises a network design and the plurality of objects include a map, location, floor, room, cabinet, device, port, and cable for the network design.

* * * * *